United States Patent [19]

Vig

[11] 4,099,889
[45] Jul. 11, 1978

[54] REAMER

[75] Inventor: Istvan Vig, Olten, Switzerland

[73] Assignee: Merz AG Dulliken, Dulliken, Switzerland

[21] Appl. No.: 794,526

[22] Filed: May 6, 1977

Related U.S. Application Data

[62] Division of Ser. No. 622,856, Oct. 16, 1975, Pat. No. 4,040,765.

[30] Foreign Application Priority Data

Oct. 18, 1974 [CH] Switzerland .................. 13983/74

[51] Int. Cl.² ............................................ B23B 31/04
[52] U.S. Cl. .................................. 408/239 R; 279/8; 90/11 A
[58] Field of Search .................. 408/238, 239, 239 A; 279/8, 103; 90/11 A, 11 D

[56] References Cited

U.S. PATENT DOCUMENTS

| 2,383,688 | 8/1945 | Seiter | 279/8 |
| 2,996,302 | 8/1961 | Haviland et al. | 279/103 |

FOREIGN PATENT DOCUMENTS

| 864,432 | 1/1941 | France | 90/11 A |

Primary Examiner—Gil Weidenfeld
Attorney, Agent, or Firm—William J. Daniel

[57] ABSTRACT

A reamer having a tool shank and a detachable reamer head in which the shank is provided at one end with means to be engaged by the spindle of a machine tool and at the other with a sleeve defining a conical socket and the reamer head has an integral conical butt for engagement in the shank socket, the butt being detachably secured in the socket by means of a rigid force transmitting member extending lengthwise of the tool shank and connected at its ends to the reamer head butt and an axially movable screw threaded counterpiece engaged in screw threaded fashion on the shank so that rotation of the screw threaded counterpiece exerts a longitudinal force to draw the reamer head butt into and out of the conical head socket. Cooperating detent means are provided on the reamer head butt and tool shank sleeve to prevent relative rotation therebetween. The force transmitting member can take the form of a rod extending within a coaxial bore within the tool shank and threadwise engaged at one end with the butt and connected to the counterpiece at the other. In one embodiment, the connection can be a sliding one, the rod having an integral transversely extending crosspiece which is engaged between the parts of a double collar threaded on the tool shank. In another embodiment, the member can have a direct threadwise connection with a threaded socket at the base of the conical socket, a lengthwise passage being provided axially through the reamer head and butt to allow the member to be mechanically engaged and rotated.

9 Claims, 2 Drawing Figures

REAMER

This is a division, of Ser. No. 622,856, filed Oct. 16, 1975 now U.S. Pat. No. 4,040,765.

The invention relates to a reamer with a tool shank and a detachable reamer head, in which the tool shank is provided in the area of its one shank end with arranged first holding means for the fitting or the fixing thereof in the lathe spindle of a machine tool, as well as in the area of its other shank end with arranged second holding means encompassing the two parts of a conical clutch for a tool provided with a suitable conical clutch counterpiece, as well as with means for releasing the conical clutch with a view to the separation of the tool from the shank.

Tool shanks of the type that is used in the above-mentioned reamer are generally known in tool technology under the name of double cone or also conical extension. Such a double cone is used, when the lathe spindle of the machine tool is too short, so to speak as an extension of the tool shank of a tool fixedly joined to the shank or directly as a tool shank for tools which are provided only with a conical neck for direct insertion into the lathe spindle of the machine tool or for insertion into a socket arranged between tool and lathe spindle. For example, in the case of drilling machines, it is known to insert into the drill spindle first of all a spindle sleeve and then, into the drill spindle, either the drill direct or also a double cone acting as an extension, into which the drill is then inserted.

The known double cone consists essentially in a shank with a cone in the area of its one shank end for insertion into the lathe spindle of the machine tool, or an inserted sleeve, and with a hollow cone in the area of its other shank end for insertion of a tool provided with a conical neck, as well as with a recess extending transversally through the shank, into which the hollow cone opens out. This recess constitutes the means for the release of the conical coupling constituted by the hollow cone on the one hand, and by the conical neck of the tool on the other hand, because the end of the conical neck of the tool protrudes into this recess, in such a manner that the conical coupling can be released by means of a wedge-shaped drift inserted into the recess, and the tool can be ejected out of the double cone.

The release of the conical coupling in this case proceeds in detail in such a manner that the wedge-shaped drift is inserted into the recess in the shank of the double cone between the upper end of the tool neck and one front wall of the recess, until the wedge-shaped drift sits firmly, and then a knock is given to the drift, in such a manner that its wedge-shaped forward end is pushed still further into the recess, the tool being pushed downwards in this event, when the conical coupling is released, or in such a manner that the wedge-shaped drift is pivoted after insertion into the recess in the direction of the axis of the double cone, when the drift leans on one edge of the front surface of the recess and the front end of the drift moves in the recess in a downwardly direction, thus releasing the conical coupling through pressure onto the tool neck.

In both cases, and thus both in the case of the knock on the drift and in the case of a pivoting movement thereof, there is the danger that the rotation of the double cone will be adversely affected. This is easy to understand as regards the knock, as the direction of knocking indeed lies substantially transversally to the axis of the double cone and a transversal knock on a shaft may, as is well known, easily lead to a so-called circular twist of the shaft. With a pivoting movement of the drift there is caused in principle a bending of the double cone transversally to its shank axis or, in more precise terms, a bending of the part of the double cone provided with the hollow cone relatively to the part of the double cone provided with the cone which also as a result of the slight unelastic deformation remaining after the bending (which deformation is to be attributed to material hysteresis) may lead to a circular twist of the double cone.

Naturally, in the case of these circular twists caused by expulsion, the circular twists are only relatively slight as a rule, and with the greater permissible working tolerances they play no substantial part. For this reason, expulsion in the manner described hereinabove is still today generally usual is adopted.

However, as soon as either the tolerance claims, as has been observed for example recently in automobile engineering, are considerably increased, or tools are to be operated for whose accuracy of operation high claims are generally made, such as, for example, reamer heads, the circular twists caused by the expulsion processes described hereinabove may be to some extent of considerable importance.

The object at the basis of the invention was therefore to produce a reamer of the type described hereinabove in which a release of the cone coupling between tool shank and reamer head is possible without causing any circular twist at all.

According to the invention this is achieved in the case of a reamer of the type described hereinabove in that the means for the release of the conical coupling comprise a screw thread arranged on the tool shank coaxially to the shank axis, a screw thread counterpiece fitting the screw thread as well as application surfaces which are in force-locking connection with it for the exerting of a torque on the screw thread counterpiece, and a ram member movable in the axial direction of the shank for the transmission of the axial movement of the screw thread counterpiece occurring on a rotation of the screw thread counterpiece relative to the shank to detachable coupling means, between the ram member and the reamer head, transmitting forces in the axial direction of the shank.

The advantage achievable by this means is that on the release of the conical coupling there are exerted on the took shank torsion forces exclusively, and forces acting in the axial direction of the shank, but no forces acting transversally to the axial direction and no bending forces, as torsion forces and forces acting along the axial direction of the shank, as opposed to transversal and bending forces, cause no circular twists.

A first preferred form of embodiment of the reamer under consideration is characterised in that the said one of the two ends of the conical coupling belonging to the second holding means is a hollow cone arranged in the tool shank in the area of its said other shank end coaxially with the shank axis and opening out towards the shank end, and the reamer end is provided with a conical neck fitting in the hollow cone, and in that the ram member comprises a ram arranged in a central opening in the tool shank opening out into the hollow cone and a connecting member between the ram and the screw thread counterpiece transmitting axial movements of the screw thread counterpiece. In this form of embodiment two advantageous alternatives are possible, i.e.

firstly that the screw thread arranged on the tool shank is arranged externally on the tool shank, and the screw thread counterpiece is a nut which is preferably provided with a knurling or a hexagon as surfaces of application for the carrying out of a torque, and secondly, that the screw thread arranged on the tool shank is an internal thread arranged in the said central opening in the tool shank and the screw thread counterpiece is a screw thread arranged on the circumference of a journal rigidly connected with the ram and forming the screw thread counter piece.

In the first alternative the connection member for the transmission of the axial movement of the nut onto the ram may advantageously comprise a cross-bar joined in the form of a T with the ram, which cross-bar is movably led in the axial direction in a recess extending transversally to the shank axis through the shank, and whose ends protruding laterally out of the shank form bearing surfaces for the nut, whereby the said central bore opening out at one end into the hollow cone opens out at the other hand into the recess, and the ram led through the opening is connected with the cross-bar in the area of the recess, preferably by means of a screwed connection. Advantageously in this arrangement, for the connection of the nut with the ram member, a connection element may be provided between the nut and the ends projecting laterally out of the shank of the cross-bar connected in the form of a T with the ram; this connection element transmits only axial movements of the nut to the cross-bar. The connection element may in this arrangement appropriately comprise a bearing surface, annular in shape, supporting the ends of the cross-bar protruding out of the shank, whose internal diameter is shorter than the length of the cross-bar and greater than the shank diameter in the area of the recess extending through the shank and used for taking up the cross-bar, and whose outer diameter is preferably greater than the length of the cross-bar, and a hollow cylindrical part connecting the annular bearing surface with the nut, the internal diameter of said part being greater than the length of the cross-bar.

The said removable coupling means between the ram member and the reamer head may advantageously consist in this first alternative in cooperating abutment surfaces on the ends turned towards each other of the ram and of the conical neck of the reamer head. Even more advantageous, in particular as regards the prevention of a possible coming off, taking place under unfavourable working conditions, of the reamer head from the tool shank on extraction from the processed workpiece, will it be if the said detachable connecting means between the ram member and the reamer head are formed by a releasable connection, comprising two connection elements gripping into each other, which connection transmits at least tractive and compressive forces. This connection transmitting tractive and compression forces may appropriately be a screwed connection between the end of the ram turned towards the hollow cone and the conical neck of the reamer head, preferably with a threaded tail at the end of the ram and a threaded orifice in the conical neck of the reamer head. The connection transmitting tractive and compressive forces may, however, also advantageously be a bayonet coupling between the end of the ram facing the hollow cone and the conical neck of the reamer head.

In the stated second alternative of the above-mentioned first preferred form of embodiment of the reamer under consideration the reamer head may be advantageously provided with a central hole extending through it as well as its conical neck, and the ram can appropriately be provided on its end facing the reamer head and accessible through the hole in the reamer head with the said application surfaces for the carrying out of a torque on the thread counterpiece, preferably with a screw slit.

The stated releasable coupling means between the ram member and the reamer head may be appropriately formed in this second alternative of a releasable connection, comprising two connection elements gripping into each other, which connection transmits at least tractive and compressive forces. The connection transmitting tractive and compressive forces may preferably be a screwed connection which is formed of an internal thread in the hole extending through the reamer head and its conical neck, and of a thread on the circumference of the ram end facing the reamer head. The threads of the screwed connection between ram and reamer head and between the pin on the ram and the hole in the tool shank may in this instance appropriately be threads of the same direction of rotation, preferably right-hand threads, and have different pitches, with the thread pitch of the screwed connection between ram and reamer head being preferably smaller than the thread pitch of the screwed connection between the pin on the ram and the hole in the tool shank. However, also, of the threads of the screwed connections between ram and reamer head, and between the pin on the ram and the hole in the tool shank, one may be a right-handed thread, and the other a left-handed thread.

A second advantageous form of embodiment of the reamer under consideration is characterised in that the said one of the two ends of the conical coupling belonging to the second holding means is a cone arranged on the tool shaft in the area of its said other shank end coaxially to the shank axis, tapering down towards the shank end, and the reamer head is provided with a hollow cone fitting on the cone, and in that the ram member comprises a hollow cylinder surrounding the tool shank, passed on the shank movably in the axial direction of the shank, and in that the thread arranged on the tool shank is arranged externally on the tool shank, and the screw thread counterpiece is a nut which is preferably provided with a knurling or a hexagon as surfaces of application for the carrying out of a torque. Also in this form of embodiment there should be provided, to prevent the already mentioned possible coming away of the reamer head from the tool shank on extraction from the processed work piece, in appropriate manner, between the nut and the hollow cylinder, and between the hollow cylinder and the reamer head, connection which at least transmit tractive and compression forces. These connections may appropriately be formed in such a manner that the nut and the hollow cylinder are firmly joined together, preferably as one piece, and that the hollow cylinder, at its end facing the said other shank end is provided with a projection, and the reamer head is provided with a suitable annular groove taking up the hollow cylinder end provided with the projection and with an annular recess in the external side wall of the annular groove for the insertion of an abutment ring anchoring the hollow cylinder end rotationally in the annular groove. A further advantageous possibility of construction of the connections discussed is that the nut and the hollow cylinder are firmly joined together, preferably as one piece, and that the hollow cylinder, at its end facing the said other shank end is connected with the reamer head by means of a screwed connection, whose thread, as compared with the thread of the nut, is of a different direction of rotation, or has a different pitch if the direction of rotation is the same.

Furthermore, in the reamer under consideration, in the event of relatively great forces or torques having to be transmitted from the tool shank to the reamer head, there may be advantageously arranged on the reamer head and in the area of the said other shank end of the tool shank driving means for the transmission of force from the tool shank to the reamer head, preferably a driver pin, and recesses designed for the engagement of a driver pin. In the first above-mentioned form of embodiment these driving means may consist advantageously in a driver pin on the reamer head and in two oppositely lying slits in the shank end provided on the said other shank end of the tool shaft.

On the basis of the Figures attached the invention will be described in more detailed hereinunder on the basis of two examples of embodiment.

Figure 1:
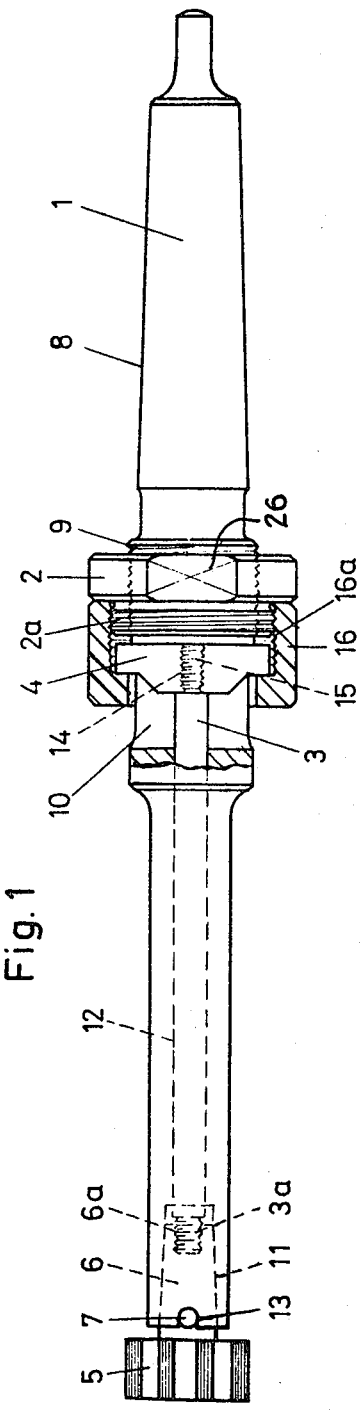
FIG. 1 is an example of construction of the stated first alternative of the stated first form of embodiment of the reamer under consideration, partly in cross-section.

The example of embodiment shown in FIG. 1 of the reamer under consideration is formed of seven parts, that is to say the reamer shank 1, the nut 2 provided with the threaded pin 2a, the ram 3 provided with the threaded extension 3a on its left-hand side end shown in FIG. 1, as well as the cross-bar 4 which together form a T-shaped ram member, and furthermore the connection element 16 provided with the internal thread 16a on its right-hand end as shown in FIG. 1, between the nut 2 and the ends of cross-bar 4 projecting laterally out of the shank, the reamer head 5 with the conical neck 6 having the thread opening 6a, and the driver pin 7.

The tool shank 1 is provided in the area of its one shank end in usual manner with a cone 8 forming the first holding means mentioned above for the insertion of the shank 1 into the lathe spindle of a machine tool, with the screw thread 9 arranged substantially in the middle of the shank, onto which, as may be seen in FIG. 1, the nut 2 is screwed, with the recess 10 in the shape of a longitudinal hole extending through the shank, with the hollow cone 11 arranged in the are of the other shank end and forming the above-mentioned second holding means, with the central hole 12 opening out on the one hand into the hollow cone 11 and on the other hand into the recess 10, and with the two slits 13 at the shank end, lying oppositely to each other, as drive means for the transmission of force from the shank 1 to the reamer head 5, for the engagement of the drive pin 7 in the reamer head 5. The assembly of the reamer shown in FIG. 1 is effected as follows: First of all the nut 2 is passed over the shank and screwed onto the screw thread 9. Then the cross-bar 4 is pushed into the recess 10 and held in such a manner that the axis of the screwed orifice 14 provided in the cross-bar 4 corresponds with the shank axis, and then the ram 3 is pushed into the central hole 12 and is screwed into the threaded orifice 14 with its right hand threaded pin 15 of FIG. 1. If required, before screwing in, a further snap ring may be pushed over the threaded pin 15 to be used as security for the screwed connection 14, 15 against an undesirable release. Then the connection member 16 is pushed over the shank from the left-hand side shank end — as shown in the drawing — and is crewed by means of its internal thread 16a on the threaded pin 2a of the nut 2. Thereby the assembly of the tool shank is completed.

The insertion of the reamer head into the tool shank takes place as follows: First of all the nut 2 is turned relative to the shank 1 in such a manner that it moves towards the left-hand side shank end. Thereby the ram 3 is also pushed towards the left-hand side shank end and the threaded extension 3a moves inside the hollow cone 11 leftwards. The rotation of the nut is continued until the threaded extension 3a of the ram 3 in the follow cone 11 is sufficiently moved to the left for the reamer head 5 with the threaded hole 6a in its conical neck 6 to be able to be screwed completely on the threaded extension 3a, without the drive pin 7 to touch the left-hand side shank end of FIG. 1. At the final phase of the screwing of the reamer head 5 on the threaded extension 3a the reamer head is set up in such a manner that the ends of the drive pin 7 stand directly in front of the slits 13. Then the nut 2 is turned relative to the shank 1 in such a manner that it moves towards the right-hand side shank end. In this operation the nut 2 draws in, over the connection member 16, the cross-bar 4 and the ram 3, the conical neck 6 of the reamer head 5 into the hollow cone 11 in the left-hand side shank end of FIG. 1, until it sits there firmly. A further small turning of the nut 2 in the same direction provides for the firm holding of the conical neck 6 with tension in axial direction in the hollow cone 11. The turning of the nut 2 before and after the screwing on of the reamer head 5 on the threaded extension 3a until the stated firm sitting of the conical neck 6 in the hollow cone 11 is normally carried out by hand, and for the further turning aimed at achieving a tensile stress acting upon the conical neck 6, a spanner is used. In this connection it is advantageous to use a spanner with two branches, so that also on the nut 2 only a torque is exerted. However, it should be noted that also if a spanner with only one branch is used for the further turning of the nut 2 no detectable circular twist (round knocking) of the tool shank is caused. The same applies also with regards to the release of the cone coupling between the reamer head 5 provided with the conical neck 6 and the shank 1 provided with the hollow cone 11 on changing the reamer head 5. Here also a single-branch spanner may be used, although a two-branched spanner is to be preferred. To release the conical coupling the nut 2 is turned relatively to the shank 1 in such a way that it moves towards the lefthand side shank end, in fact from the start with a spanner. In the first instance the turning, until the stated tensile stress on the conical neck 6 is raised, is rather difficult, then follows a phase of relatively easier turning, in which the nut 2 moves forward to the extent of the axial play of the connection formed by parts 2, 4 and 16 and of the screw connection 3a/6a, and after this the nut 2 with its threaded pin 2a moves onto the cross bar 4 and takes along with it the ram member on its further axial movement. As a result, onto the conical neck 6, a force is exerted acting leftwards in FIG. 1, further to which the conical coupling 6, 11 is released. This further turning of the nut 2 until the release of the conical coupling 6, 11 is then again rather harder, and after the release of the conical coupling 6, 11 the nut 2 can then be turned further by hand, until the driver pin 7 has become completely expelled from the slits 13. Then the reamer head 5 can be screwed off the threaded extension 3a.

Figure 2:
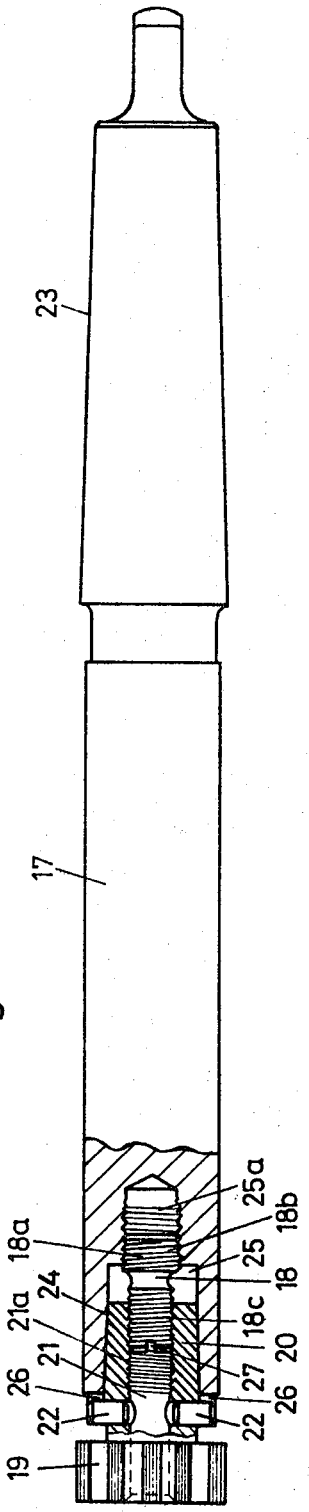
FIG. 2 is an example of construction of the stated second alternative of the stated first form of embodiment of the reamer under consideration, partly in cross-section.

The example of embodiment of the reamer under consideration shown in FIG. 2 is composed of five parts, i.e. the tool shank 17, the ram 18 provided with the pin 18a with thread 18b on its right-hand side end in FIG. 2 and with the thread 18c on its left-hand side in FIG. 2, the reamer head 19 with the conical neck 20 and the through hole 21 showing the internal thread 21a on its right-hand side end in FIG. 2, and the two driver pins 22.

The tool shank 17 is provided in the area of its one shank end in usual manner with a cone 23 forming the first holding means mentioned above for the insertion of the shank 17 into the lathe spindle of a machine tool, with the hollow cone 24 arranged in the area of the other shank end and forming the above-mentioned second holding means, with the central bore 25 opening out into the hollow cone 24 with the connected threaded hole 25a, and with the two slits 26 at the shank end, lying oppositely to each other, as drive means for the transmission of force from the shank 17 to the reamer head 19, for the engagement of the drive pins 22 in the reamer head 26.

The assembly of the reamer shown in FIG. 2 is effected as follows: First of all the ram 18 with its thread 18c is screwed fully into the internal thread 21s of the hole 21 extending through the reamer head 19. Then the reamer head 19 with its conical neck 20 bearing the screwed-in ram 18 is inserted into the hollow cone 24 and thereafter rotated in such a way that its drive pins 22 engage into the slits 26. On this engagement the conical neck 20 of the reamer head 19 moves a portion further into the hollow cone 24 in the tool shank 17, until the pin 18a provided on the ram 18 reaches the left-hand side end of the threaded hole 25a of FIG. 2. Thereupon, through the hole 21 in the reamer head 19, a screwdriver is inserted into the screw slit 27 and the ram 18 is rotated by means of this screwdriver clockwise, that is to say to the right. As the pitch of the screwed connection formed by the thread 18b and the thread of the threaded hole 25a is greater than the pitch of the screwed connection formed by the thread 18c and the internal thread 21a, and the threads of the two screwed connections are right-hand threads, as a result of this rotation to the right of the ram 18 with the screwdriver the conical neck 20 on the reamer head 19 is drawn into the hollow cone 24 in the tool shank 17. The screwdriver is now turned to the right until the conical neck 20 sits firmly in the hollow cone. A further small turning of the screwdriver or of the ram 18 in the same direction provides for the firm holding under tension in the axial direction of the conical neck 20 in the hollow cone 24.

To release the conical coupling between the reamer head 19 provided with the conical neck 20 and the shank 17 provided with the hollow cone 24 on the changing of the reamer head 19, the reverse sequence is followed, i.e. the ram 18 is turned to the left with the screwdriver, as a result of which first of all the said tension on the conical neck 20 is released, and on further turning the conical neck 20 is then released out of the hollow cone 24. The turning of the ram 18 or of the screwdriver is then continued further until the thread 18b on the pin 18a is fully unscrewed out of the threaded hole 25a, and thereafter the reamer head 19 may be removed from the shank 17. Further, the ram 18 is extracted by rotation from the reamer head 19 and can then be inserted into the new reamer head.

I claim:

1. A reamer comprising a tool shank having at one end means for engagement in the lathe spindle of a machine tool and at the other end a conical socket; a reamer head having an integral conical butt for seating engagement in said socket to achieve precision alignment of said head with said tool shank; and means for releasably securing the conical butt in said socket, said releasable securing means comprising a screw threaded recess at the bottom of said conical socket, a screw-threaded recess in the inner end of said conical butt, and a securing rod having screw threads on its opposite ends for engagement with both said recesses.

2. The reamer of claim 1 including cooperating detent means on said socket and butt respectively for preventing rotation of said reamer head relative to said tool shank.

3. The reamer of claim 1 including means for independently rotating said securing rod while the threaded ends thereof are simultaneously engaged in said recesses.

4. The reamer of claim 3 wherein said rotating means comprises an axial passage extending from the outer end of said reamer head to the inner end of the threaded recess in said reamer head, through which access may be had to the end of said rod engaged in said recess, and a drive surface on said latter rod end for engagement with a tool to rotate said rod.

5. The reamer of claim 4 wherein said drive surface comprises a slot in said rod end for engagement with a screw driver or the like.

6. The reamer of claim 3 wherein said screw threads in said recesses have the same hand, with the pitch of one being greater than the other and the threads on said rod ends are correspondingly threaded.

7. The reamer of claim 3 wherein the screw threads on said recesses have opposite hands and the threads on said rod ends are correspondingly threaded.

8. The reamer of claim 2 wherein the pitch of screw threads in the recess at the bottom of said conical socket is greater than the pitch of the screw threads in the recess in said conical butt end.

9. A reamer according to claim 2 characterized in that said detent means comprises a driver pin on the reamer head and two oppositely situated recesses in the shank end sleeve for engaging the ends of pin.

* * * * *